(12) United States Patent
Takamatsu et al.

(10) Patent No.: US 11,137,598 B2
(45) Date of Patent: Oct. 5, 2021

(54) DISPLAY DEVICE

(71) Applicant: YAZAKI CORPORATION, Tokyo (JP)

(72) Inventors: Masahiro Takamatsu, Shizuoka (JP); Masahide Nagata, Shizuoka (JP); Takao Kanai, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 468 days.

(21) Appl. No.: 15/285,995

(22) Filed: Oct. 5, 2016

(65) Prior Publication Data

US 2017/0097505 A1    Apr. 6, 2017

(30) Foreign Application Priority Data

Oct. 6, 2015  (JP) .............................. JP2015-198520

(51) Int. Cl.
*G02B 27/01*    (2006.01)
*G09G 3/00*    (2006.01)
(Continued)

(52) U.S. Cl.
CPC .......... *G02B 27/0149* (2013.01); *B60K 35/00* (2013.01); *B60K 37/00* (2013.01);
(Continued)

(58) Field of Classification Search
CPC ............ G02B 27/0101; G02B 27/0149; G02B 2027/0161; G02B 2027/0165;
(Continued)

(56) References Cited

U.S. PATENT DOCUMENTS

2001/0008394 A1\* 7/2001 Kanamori ............. G02B 27/01
                                                                345/7
2002/0089756 A1   7/2002 Aoki et al.
(Continued)

FOREIGN PATENT DOCUMENTS

JP        2-58284 U    4/1990
JP     2005-35409 A    2/2005
(Continued)

OTHER PUBLICATIONS

Japanese Office Action for the related Japanese Patent Application No. 2015-198520 dated Nov. 7, 2017.
(Continued)

*Primary Examiner* — William Boddie
*Assistant Examiner* — Saifeldin E Elnafia
(74) *Attorney, Agent, or Firm* — Kenealy Vaidya LLP (57) ABSTRACT

A display unit is equipped with an LED circuit body for irradiating light onto the windshield of a vehicle and a surface panel positioned on the front side in the light irradiating direction of the LED circuit body and constituting part of the surface of the instrument panel of the vehicle. The surface panel is provided with a plurality of pores formed in the direction connecting the LED circuit body to the windshield. The light irradiating direction of the LED circuit body is set to the direction in which the light irradiated from the LED circuit body and reflected by the windshield is visually recognized by the driver.

13 Claims, 8 Drawing Sheets

(51) Int. Cl.
  *B60K 37/00* (2006.01)
  *B60K 35/00* (2006.01)
  *G09G 5/14* (2006.01)
(52) U.S. Cl.
  CPC ......... *G02B 27/0101* (2013.01); *G09G 3/002* (2013.01); *G09G 5/14* (2013.01); *B60K 2370/1529* (2019.05); *B60K 2370/28* (2019.05); *B60K 2370/334* (2019.05); *B60K 2370/339* (2019.05); *B60K 2370/70* (2019.05); *B60K 2370/785* (2019.05); *G02B 2027/0161* (2013.01); *G02B 2027/0165* (2013.01); *G02B 2207/123* (2013.01); *G09G 2380/10* (2013.01)
(58) Field of Classification Search
  CPC .... G02B 2207/123; G09G 5/14; G09G 3/002; G09G 2380/00; G09G 2380/10; B60K 35/00; B60K 2350/2052; B60K 2350/92; B60K 37/00; B60K 2370/1529; B60K 2370/339; B60K 2370/28; B60K 2370/334; B60K 2370/785; B60K 2370/70
  See application file for complete search history.

(56) References Cited

U.S. PATENT DOCUMENTS

| | | |
|---|---|---|
| 2007/0279317 A1 | 12/2007 | Matsumoto et al. |
| 2008/0212196 A1* | 9/2008 | Watanabe ............ G02B 27/01 359/632 |
| 2012/0200476 A1* | 8/2012 | Kanamori .......... G02B 27/0101 345/7 |
| 2013/0076787 A1 | 3/2013 | Mathieu et al. |
| 2013/0088412 A1 | 4/2013 | Helot et al. |
| 2014/0091988 A1* | 4/2014 | Masuda ............. G02B 27/0149 345/7 |
| 2015/0234185 A1* | 8/2015 | Inomata ................ G02B 5/0247 359/599 |
| 2016/0200249 A1 | 7/2016 | Boyd et al. |
| 2016/0379498 A1 | 12/2016 | Aoki |

FOREIGN PATENT DOCUMENTS

| | | |
|---|---|---|
| JP | 2008-68767 A | 3/2008 |
| JP | 2008-290685 A | 12/2008 |
| JP | 2011-105306 A | 6/2011 |
| JP | 2012-210901 A | 11/2012 |
| JP | 2013-159172 A | 8/2013 |
| JP | 2015-104930 A | 6/2015 |
| JP | 2015-168265 A | 9/2015 |
| JP | 2015-168382 A | 9/2015 |
| JP | 2015-169431 A | 9/2015 |
| JP | 2016-60247 A | 4/2016 |
| JP | 2016-60250 A | 4/2016 |
| WO | 2015/079654 A1 | 6/2015 |

OTHER PUBLICATIONS

Japanese Office Action for the related Japanese Patent Application No. 2015-198520 dated May 29, 2018.

* cited by examiner

DISPLAY DEVICE

CROSS REFERENCE TO RELATED APPLICATIONS

This application is based on and claims priority from Japanese patent application No. 2015-198520 filed on Oct. 6, 2015, the entire contents of which are incorporated herein by reference.

BACKGROUND OF THE INVENTION

1. Technical Field

The present invention relates to a display device for displaying information.

2. Background Art

Conventionally, head-up display (HUD) units for projecting images onto the front window of a vehicle have been known as devices for displaying images around the sight line of the driver of the vehicle (refer to Patent Document JP-A-2011-105306). Furthermore, HUD units having a combiner and being used to project images onto the combiner have also been known (refer to Patent Document JP-A-2015-104930).

SUMMARY

However, since such a conventional HUD unit is installed in a state of being exposed to the surface of the instrument panel of a vehicle, the surface of the instrument panel is not formed into a smoothly curved face. In particular, the HUD unit has an opening section on its upper face.

The conventional HUD unit is thus in a state of being always visible to the driver or an occupant, whereby the driver or the occupant sees the light source of the display device directly. This configuration degrades the design property of the display device and impairs the attractive appearance around the instrument panel. Furthermore, the opening section of the display device itself causes the impairment of the attractive appearance around the instrument panel.

The present invention has been made in consideration of the above-mentioned circumstances, and an object of the present invention is to provide a display device capable of enhancing the design property of the display device and maintaining the attractive appearance around the instrument panel by not making the light source of the display device directly visible to the driver or the occupant.

To attain the above-mentioned object, the display device according to the present invention is characterized as described in the following items (1) to (4).

(1) A display device, comprising
a display section for irradiating light to the windshield of a vehicle, and
a surface panel positioned on a front side in a light irradiating direction of the display section and constituting part of a surface of an instrument panel of the vehicle, wherein
the surface panel is provided with a plurality of holes formed in a direction connecting the display section to the windshield, and a light irradiating direction of the display section is set to a direction in which the light irradiated from the display section and reflected by the windshield is visually recognized by the driver.

(2) The display device described in the above mentioned item (1), wherein
the display section is implemented as a pair of display sections installed on the left and right sides.

(3) The display device described in the above mentioned item (2), wherein
an instrument unit for displaying states of the vehicle is installed in the instrument panel, and
the display section is implemented as a pair of display sections installed on the left and right sides of the instrument unit.

(4) The display device described in the above mentioned item (3), comprising
a control section for controlling display produced by the display section and the instrument unit, wherein
the control section relates a content of the display produced by the display section to a content of the display produced by the instrument unit.

With the display device configured as described in the above-mentioned item (1), the design property of the display device can be enhanced and the attractive appearance around the instrument panel can be maintained by not making the light source of the display device directly visible to the driver or the occupant. Furthermore, since the display device has the surface panel with design property, the display device can produce novelty, stylishness and surprise to viewers. Moreover, since the display device is covered with the surface panel, the driver cannot recognize the existence of the display device when it is turned off but can recognize the existence of the display device only when it is turned on, whereby the performance effect of the display device can be enhanced.

With the display device configured as described in the above-mentioned item (2), since the display device is implemented as a pair of display devices installed on the left and right sides, the driver can easily understand the driving states of the vehicle and can drive conveniently and safely according to two pieces of information projected by the left and right display devices.

With the display device configured as described in the above-mentioned item (3), since the display device is implemented as a pair of display devices installed on the left and right sides so that the instrument unit is placed therebetween, the driver can visually compare the two pieces of information projected by the left and right display devices with the information displayed on the instrument unit, whereby the driver can get more detailed driving states.

With the display device configured as described in the above-mentioned item (4), since the image projected by the display device and the image displayed on the instrument unit are related mutually, the driver can get more useful information by visually recognizing the two images.

With the present invention, the design property of the display device can be enhanced and the attractive appearance around the instrument panel can be maintained by not making the light source of the display device directly visible to the driver or the occupant.

The present invention has been described above briefly. Moreover, the details of the present invention will be further clarified by reading the descriptions of the modes (hereafter referred to as "embodiments") for embodying the invention to be described below by referring to the accompanying drawings.

DETAILED DESCRIPTION OF EMBODIMENTS

Specific embodiments according to the present invention will be described below referring to the accompanying drawings.

Figure 1:
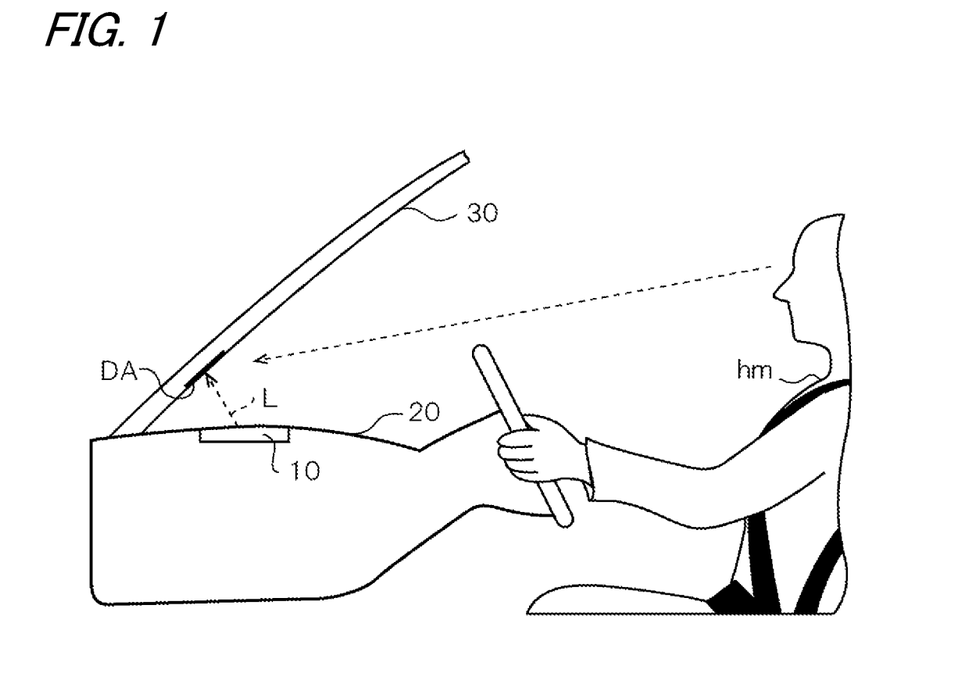
FIG. 1 is a view showing a region in the vicinity of the instrument panel of a vehicle in the case that the inside of the vehicle compartment on the side of the driver's seat of the vehicle according to an embodiment is viewed from the side.

FIG. 1 is a view showing a region in the vicinity of the instrument panel 20 of a vehicle in the case that the inside of the vehicle compartment on the side of the driver's seat of the vehicle according to an embodiment is viewed from the side. A display unit 10 is installed on the vehicle front side of the instrument panel 20 so as to face the driver hm sitting in the driver's seat with the steering wheel placed therebetween.

Figure 2:
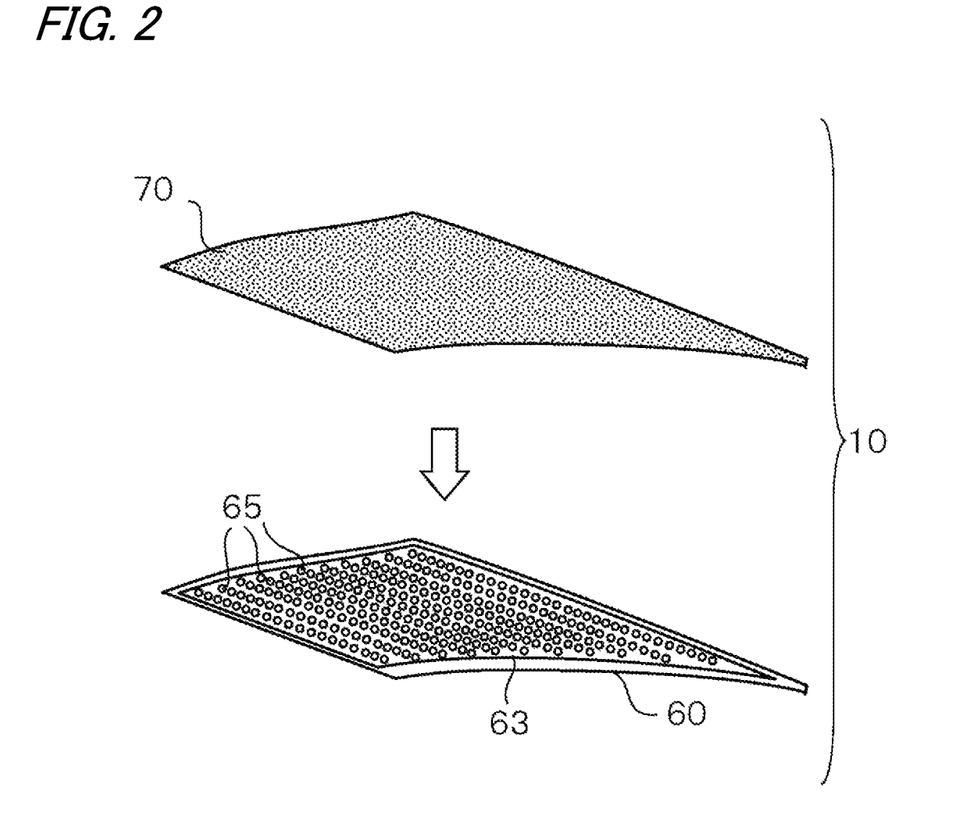
FIG. 2 is a view showing the structure of a display unit.

FIG. 2 is a view showing the structure of the display unit 10. The display unit 10 is configured as part of the instrument panel 20 and has a structure in which an LED circuit body 60 and a surface panel 70 are laminated and connected to each other.

The LED circuit body 60 is made by arranging a plurality of LED light sources (point light sources) 65 stepwise on a mount substrate 63. The surface panel 70 has an outer shape so as to be overlapped with LED circuit body 60. The face of the surface panel 70, not opposed to the LED circuit body 60, has a curved face being continuous to the surface of the instrument panel 20. With this configuration, the surface panel 70 is visually recognized as part of the instrument panel 20 by the occupant.

The mount substrate 63 is formed by a PCB (printed circuit board) and is made of a strong material having rigidity and being hardly deformed. However, it may be possible that the mount substrate has flexibility and is formed of a material being deformable along the curved face of the instrument panel.

Figure 3A:
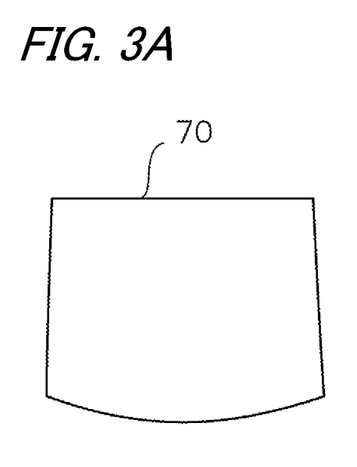
FIG. 3A is a view showing the outer shape of a surface panel.

FIG. 3A is a view showing the outer shape of the surface panel 70. The surface panel 70 is configured so that the light (diffused light) L emitted from the LED light sources 65 so as to be diffused forward is directed to a front window 30 (see FIG. 1) and so that part of the light is shielded so as not to be visible from the side of the occupant. In this embodiment, the surface panel is formed of a resin material, such as acrylic or fiber-reinforced plastic, to give a sense of unity with the instrument panel, but may be formed of a metallic material, such as aluminum, stainless steel or an alloy thereof.

Figure 3B:
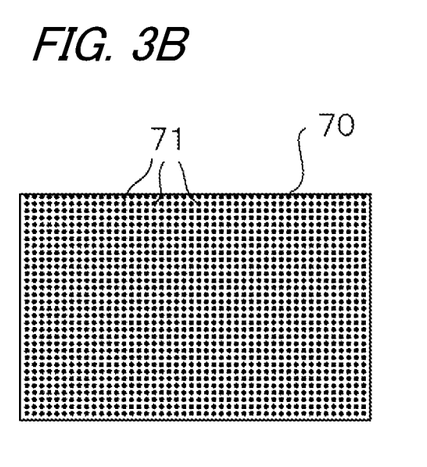
FIG. 3B is a partially enlarged view showing the surface of the surface panel.

FIG. 3B is a partially enlarged view showing the surface of the surface panel 70. Numerous pores 71 are formed in the surface panel 70. Although the opening section of the pore 71 has a circular shape in this embodiment, the opening section may have an arbitrary shape, such as an elliptical shape or a polygonal shape.

Figure 3C:
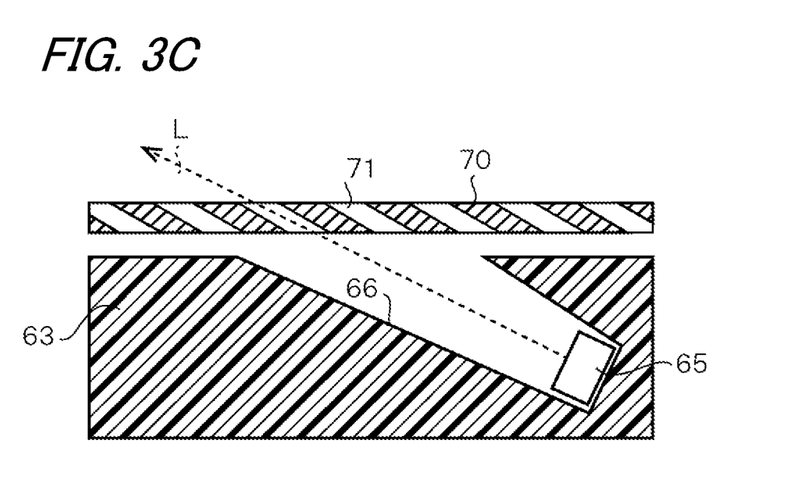
FIG. 3C is a view illustrating the shape of the pores formed in the surface panel.

FIG. 3C is a view illustrating the shape of the pores 71 formed in the surface panel 70. An LED light source 65 is disposed on the bottom face of the concave section 66 formed obliquely from the surface of the mount substrate 63. The light L emitted from the LED light source 65 is projected along the inclined direction of the concave section 66.

Although the concave section in which the LED light source is disposed is formed in the mount substrate in this embodiment, it may be possible that the mount substrate is not provided and that the concave section is directly formed in the instrument panel itself and the LED light source is disposed in the concave section. Furthermore, although the LED light sources composed of numerous point light sources are used as a light source in this embodiment, one or more display panels (for example, liquid crystal display panels, organic EL panels or plasma display panels) for performing surface emission may be used.

The inner wall of the pore 71 formed in the surface panel 70 has a predetermined angle so that the axial line of the pore 71 is directed to the front window with respect to the thickness direction of the surface panel 70 so as to guide the light L from the LED light source 65 to the front window 30. In other words, the direction of the light emitted from the LED light source 65 is set so as to be aligned with the direction in which the light irradiated from the LED light source 65 and reflected by the front window 30 is visually recognized by the driver.

The inclination angle of the axial line of the pore 71 with respect to the thickness direction of the surface panel 70 is determined by the positional relationship between the surface panel 70 and the projection area DA (see FIGS. 1 and 5) to be set on the front window 30. For example, in the case of the positional relationship shown in FIG. 1, the inclination angle is set to a small value on the side of the front window 30 and is set to a large value on the side of the driver.

Figure 4:
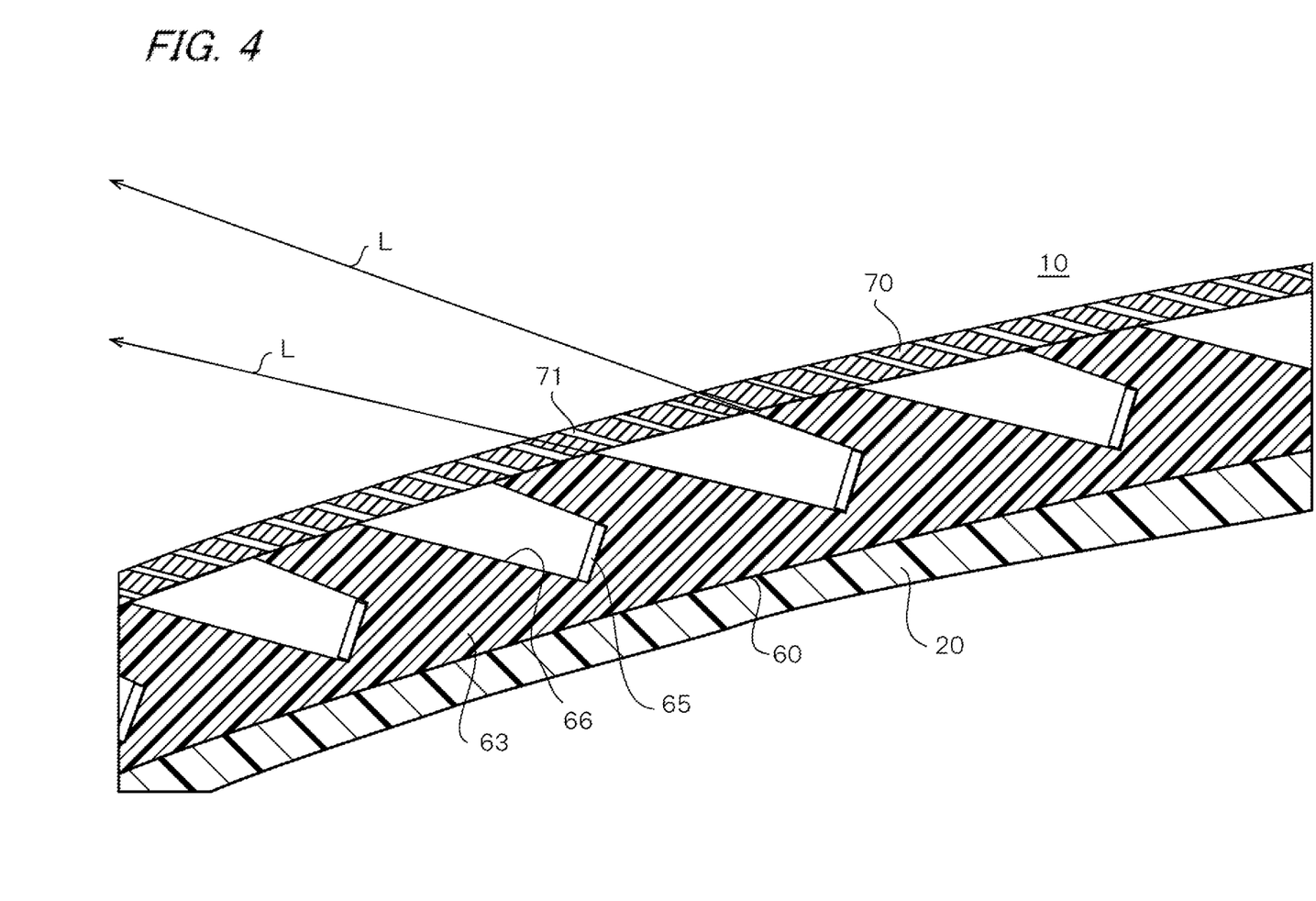
FIG. 4 is a partially enlarged cross-sectional view showing the structure of the display unit.

FIG. 4 is a partially enlarged cross-sectional view showing the structure of the display unit 10. On the surface of the mount substrate 63, the numerous concave sections 66 are formed stepwise in the direction from the front window 30 to the side of the driver's seat so as to be opened toward the front window 30 as described above. The LED light source 65 is disposed on the bottom face of each concave section 66. In other words, the numerous LED light sources 65 are disposed in lines from the side of the front window 30.

Furthermore, the surface panel 70 is provided with the plurality of pores 71 so that the light L of the LED light sources 65 emitted from the plurality of concave sections 66 is directed to the front window 30. The inclination angle of each pore 71 has been described above.

Figure 5:
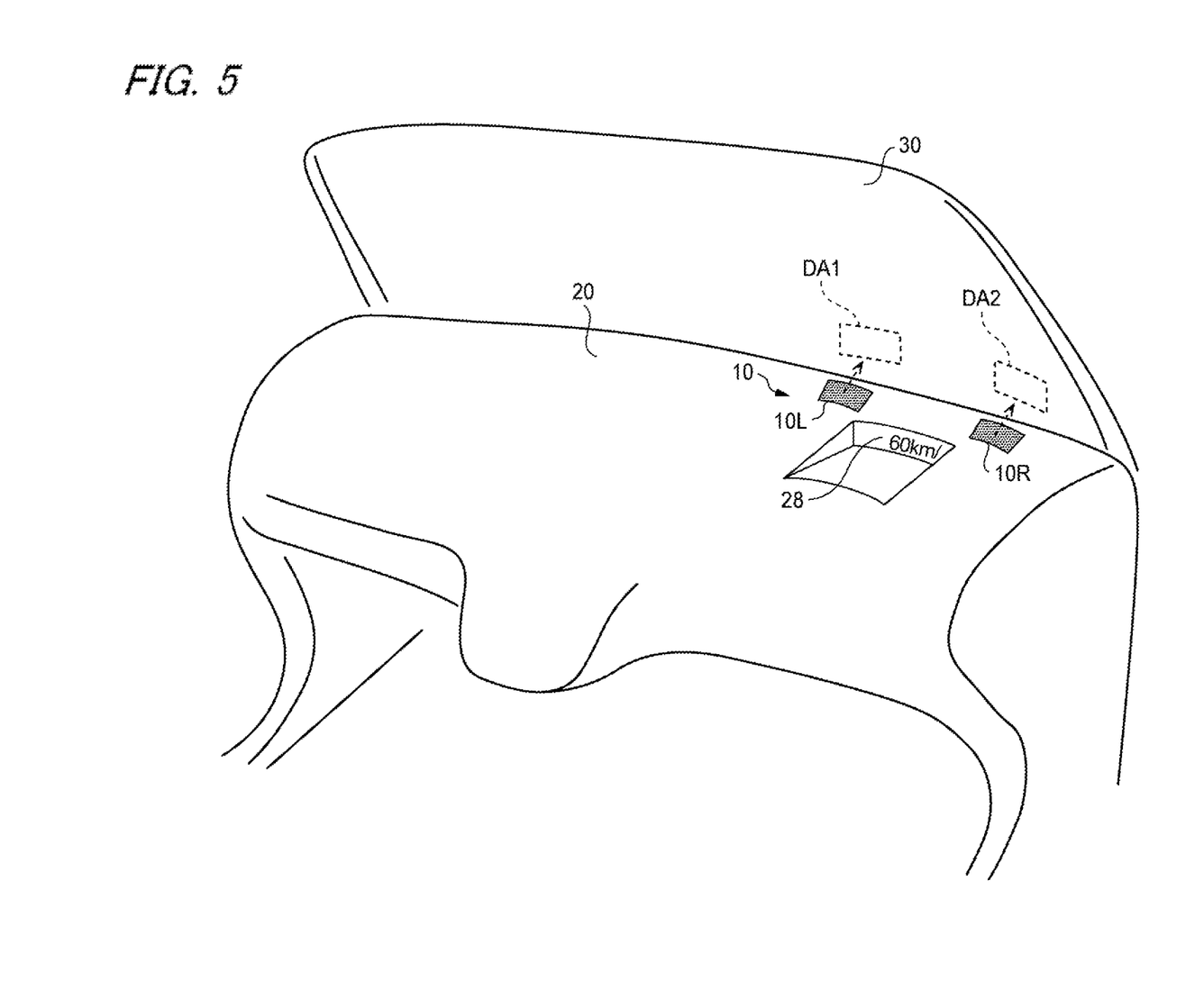
FIG. 5 is a view showing the external appearance of the inside of the vehicle compartment on the side of the driver's seat, including the instrument panel in which the display unit is installed.

FIG. 5 is a view showing the external appearance of the inside of the vehicle compartment on the side of the driver's seat, including the instrument panel 20 in which the display unit 10 is installed. In this configuration, the display unit 10 is implemented as a left and right pair of display units installed in the instrument panel 20 on the side of the driver's seat so that a display panel (instrument panel) 28 is placed therebetween. In the case that the left and right pair of display units is particularly required to be distinguished from each other, the display unit on the left side as viewed from the driver's seat is referred to as the display unit 10L, and the display unit on the right side is referred to as the display unit 10R. However, the number of the display units is not limited to two but may be one or may be three or more. Furthermore, the left and right pair of display units is not limited to be installed in the instrument panel on the side of the driver's seat but can be installed in the instrument panel on the side of the front passenger's seat.

Moreover, the display panel 28 installed between the left and right pair of display units 10 indicates, for example, the current traveling speed (herein, 60 km/h) as shown in the figure. However, engine rotation speed, fuel quantity, battery voltage, cooling water temperature, accumulated traveling distance, etc. may be displayed in addition to the traveling speed on the display panel 28 so as to be switchable by the operation of a steering switch, for example.

A meter panel may be installed on the near side of the instrument panel 20 on the side of the driver's seat. In this case, a speedometer, an engine tachometer, direction indicators, etc. are displayed on the meter panel.

The left and right pair of display units 10 is connected, for example, to an ECU (electronic control unit) installed in the instrument panel 20, and performs display operation according to instructions from the ECU. The display units may be controlled by a control unit (control section), such as a control unit (including the ECU) for controlling the panel meter and the like or may be controlled by a control unit dedicated to the display units. In any of these cases, the control unit inputs driving data representing the driving states (vehicle speed, G-value (acceleration), inter-vehicle distance, etc.) of the vehicle through an on-vehicle network or the like. The display units 10 are herein controlled by the control unit for controlling the panel meter and the like.

When the display unit 10L is turned on, an illumination light image (first image) is projected onto the projection area DA1 on the left side of the front window 30. On the other hand, nothing is projected onto the projection area DA2 on the right side because the display unit 10R is turned off. However, the left and right images may be projected by the display unit 10L and the display unit 10R so that the images are connected to each other.

Figure 6:
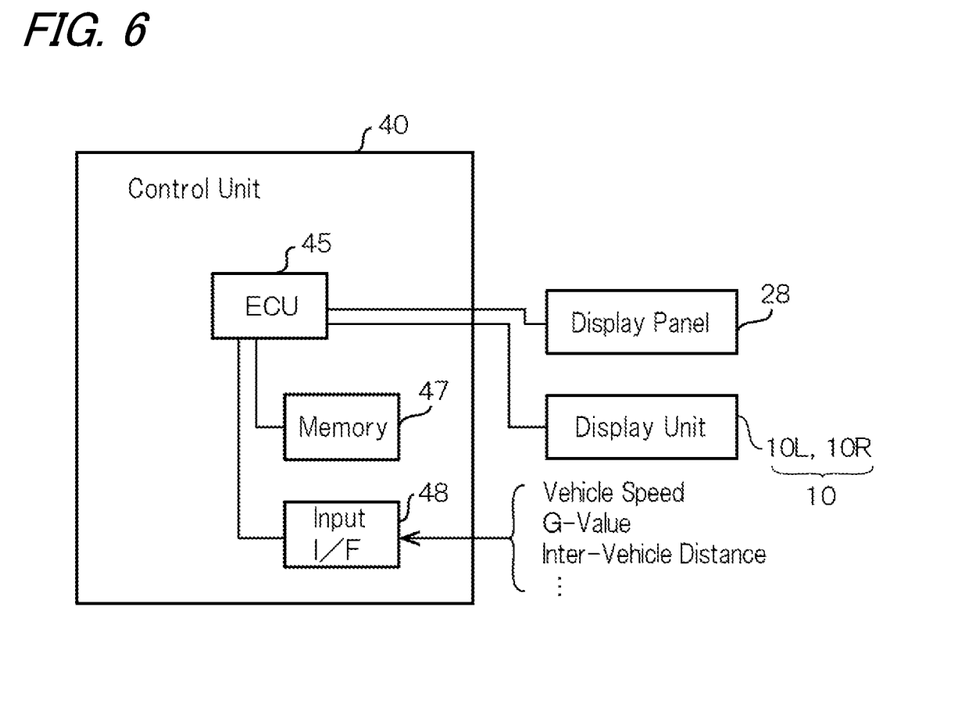
FIG. 6 is a block diagram showing the configuration of a control unit.

FIG. 6 is a block diagram showing the configuration of the control unit 40. The control unit 40 has an ECU 45, a memory 47 and an input I/F 48. The ECU 45 incorporates a CPU, a ROM, etc. and totally controls the respective sections mounted on the vehicle. In addition to the memory 47 and the input I/F 48, the display panel 28, the display unit 10, etc. are connected to the ECU 45.

The memory 47 stores operation programs to be executed by the ECU 45, display data, etc. Driving data, such as the vehicle speed, G-value and inter-vehicle distance measured by other control units, is input to the input I/F 48.

Figure 7:
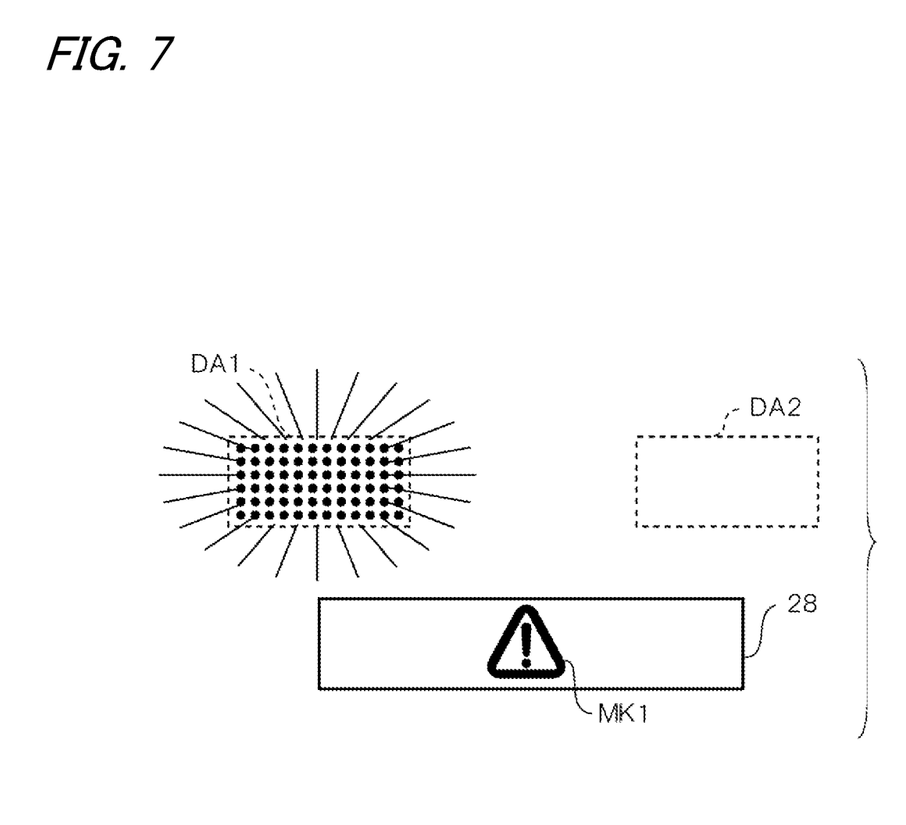
FIG. 7 is a view showing a display example displayed by the display unit implemented as a left and right pair of display units.

FIG. 7 is a view showing a display example displayed by the left and right pair of display units 10. The control unit 40 performs control to make the left display unit 10L to flicker in accordance with the flickering timing of the hazard lamp of the vehicle. With this control, a flickering image is displayed to show a warning on the projection area DA1 of the front window 30. On the other hand, the control unit 40 keeps the right display unit 10R in the off state. Furthermore, the control unit 40 makes the display panel 28 to display a warning mark MK1. The driver sees these indications and is aware of the fact that the object of the warning is over speed, for example. In this way, the control unit 40 controls the display so that a relation is established between the image projected by the display unit 10 and the image displayed by the display panel 28, thereby being capable of attracting the driver's attention so that the driver drives safely. This leads to an improvement in safe driving.

In the example described above, although the display unit 10 is used to function as a warning light by simply making all the LED light sources 65 to flicker, the display unit 10 may display dot images representing, for example, characters and marks. Furthermore, in the case that the display unit is a display panel for performing surface emission, the display unit may display various kinds of color images.

Moreover, in the example described above, although the images projected onto the left and right pair of projection areas DA1 and DA2 and the image displayed on the display panel 28 are arranged side by side in the vertical direction so as to be related mutually, these images are not limited to be arranged side by side in the vertical direction but may be arranged side by side in the left-right direction or in an inclined direction.

As described above, the display unit 10 according to this embodiment is equipped with the LED circuit body 60 for irradiating light onto the windshield 30 of the vehicle and the surface panel 70 positioned on the front side in the light irradiating direction of the LED circuit body 60 and constituting part of the surface of the instrument panel 20 of the vehicle. The surface panel 70 is provided with the plurality of pores 71 formed in the direction connecting the LED circuit body 60 to the windshield 30. The light irradiating direction of the LED circuit body 60 is set to the direction in which the light irradiated from the LED circuit body 60 and reflected by the windshield 30 is visually recognized by the driver (occupant) hm.

Furthermore, since the display unit is installed so as to form part of the surface of the instrument panel without protruding from the surface of the instrument panel, the surface of the instrument panel is smooth, and the design property and the attractive appearance of the instrument panel can be maintained. Moreover, since the display unit does not have a member such as a hood for shielding outdoor light, the degree of freedom in design is increased. What's more, since the display unit has the surface panel having design property, the display unit can produce novelty, stylishness and surprise. Still further, since the display unit is implemented as a left and right pair of display units disposed on the left and right sides of the instrument unit so that the instrument unit is placed therebetween, the driver can easily understand the driving states and can drive conveniently and safely according to two pieces of information projected by the left and right display units. Still further, since the driver can compare the two pieces of information projected by the left and right display units with the information displayed on the instrument unit, the driver can get more detailed driving states. Yet further, since the image projected by the display unit and the image displayed on the instrument unit are related mutually, the driver can get more useful information by visually recognizing the two images. More and more, since the display unit is covered with the surface panel, the driver cannot recognize the existence of the display unit when it is turned off but can recognize the existence of the display unit only when it is turned on. As a result, the performance effect of the display unit can be enhanced.

Since the light sources are not visible to the driver or the occupant directly as described above, the design property of the display unit can be enhanced, and the attractive appearance around the instrument panel can be maintained.

(Modifications)

Figure 8A:
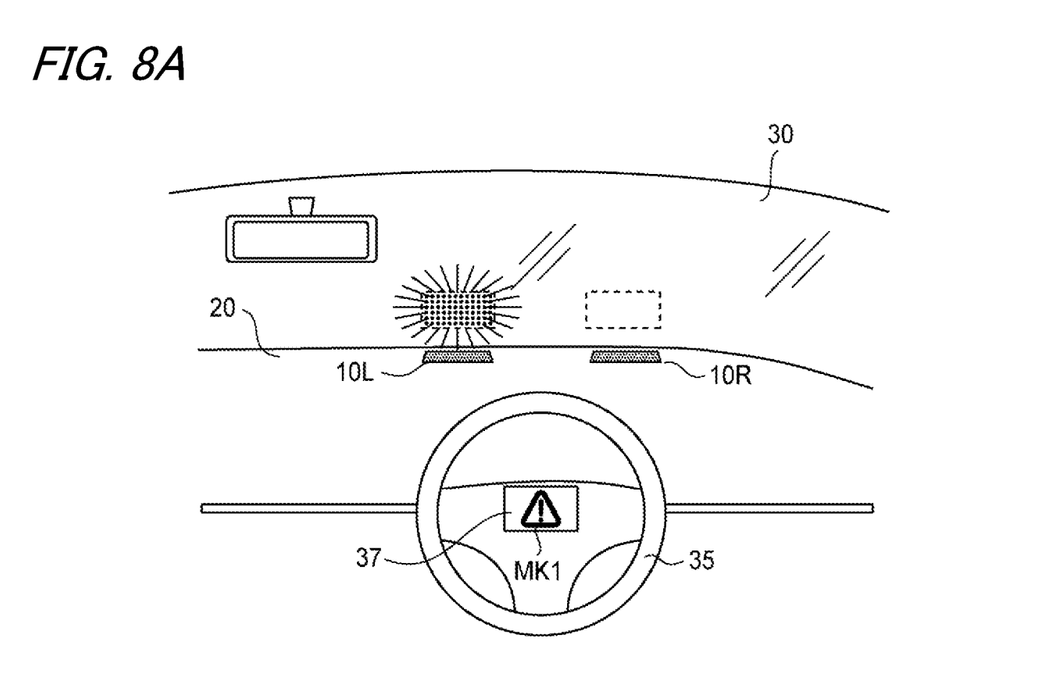
FIG. 8A is a front view showing the external appearance around the instrument panel of a vehicle according to modification 1.

FIG. 8A is a front view showing the external appearance around the instrument panel 20 of a vehicle according to modification 1. In modification 1, a display panel 37 is disposed at the central section of the steering wheel 35 of the vehicle. In this case, the warning mark MK1 displayed on the display panel 37 and the flickering image projected by the display unit 10L are related mutually. With the warning mark and the flickering image, the driver can be aware of the warning of imminent danger during driving.

Figure 8B:
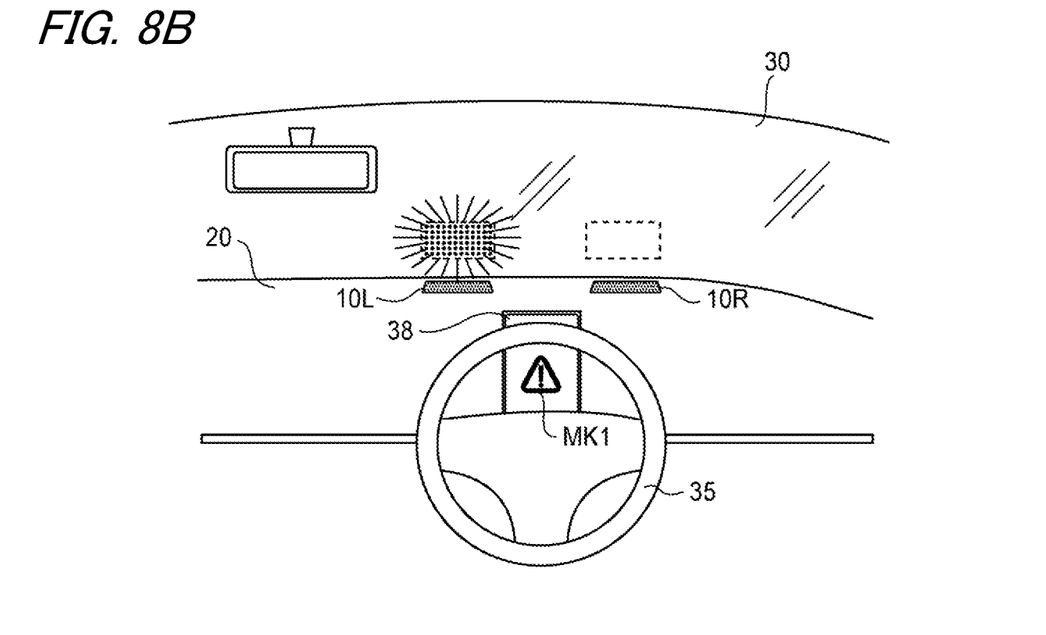
FIG. 8B is a front view showing the external appearance around the instrument panel of a vehicle according to modification 2.

FIG. 8B is a front view showing the external appearance around the instrument panel 20 of a vehicle according to modification 2. In modification 2, a display panel 38 is disposed at the position where a meter panel is disposed in a conventional vehicle. In this case, the warning mark MK1 displayed on the display panel 38 and the flickering image projected by the display unit 10L are related mutually. With the warning mark and the flickering image, the driver can be aware of the warning of imminent danger during driving as in the case of modification 1. However, a vehicle may be provided with such a meter panel not only in this modification but also in any other embodiments. In the case of this modification, it may be possible that the display panel is disposed inside the meter panel and that the warning mark displayed on the display panel and the flickering image projected by the display unit 10L are related mutually.

The technical scope of the present invention is not limited to the scope described in the above-mentioned embodiments. The above-mentioned embodiments can be changed and improved variously within the technical scope of the present invention.

For example, although the display panel has a face constituting part of the instrument panel and being as high as the other part thereof, the display panel may have a face (chevron shape) slightly raised so as to be higher than the other part or may have a face (valley shape) slightly recessed so as to be lower than the other part. With this configuration, the degree of freedom in the design of the display unit is increased.

The characteristics of the display device according to the embodiments of the present invention described above will be briefly summarized and listed in the following items [1] to [4].

[1] A display device (display unit 10) being equipped with a display section (LED circuit body 60) for irradiating light to the windshield (front window 30) of a vehicle and a surface panel (surface panel 70) positioned on a front side in a light irradiating direction of the display section and constituting part of a surface of an instrument panel of the vehicle, wherein the surface panel is provided with a plurality of holes (pores 71) formed in a direction connecting the display section to the windshield, and a light irradiating direction of the display section is set to a direction in which the light irradiated from the display section and reflected by the windshield is visually recognized by the driver (occupant) hm.

[2] The display device described in the above-mentioned item [1], wherein the display section is implemented as a pair of display sections installed on the left and right sides.

[3] The display device described in the above-mentioned item [2], wherein an instrument unit (display panel 28) for displaying states of the vehicle is installed in the instrument panel, and the display section is implemented as a pair of display sections installed on the left and right sides of the instrument unit.

[4] The display device described in the above-mentioned item [3], being further equipped with a control section (control unit 40) for controlling display produced by the display section and the instrument unit, wherein the control section relates a content of the display produced by the display section to a content of the display produced by the instrument unit.

What is claimed is:

1. A display device, comprising
a display section for irradiating light to the windshield of a vehicle, and
a surface panel positioned on a front side in a light irradiating direction of the display section and including a top surface and a bottom surface, the top constituting part of a surface of an instrument panel of the vehicle, wherein
the surface panel includes a plurality of pores formed as openings extending through the surface panel from the top surface to the bottom surface in a direction connecting the display section to the windshield, and a light irradiating direction of the display section is set to a direction in which the light irradiated from the display section and reflected by the windshield is visually recognized by the driver such that the pores in the surface panel permit passage of light from the display section to the windshield while obscuring direct visibility of the display section by the driver.

2. The display device according to claim 1, wherein
the display section is implemented as a pair of display sections spaced away from each other.

3. The display device according to claim 2, wherein
an instrument unit for displaying states of the vehicle is installed in the instrument panel at a location that is between each of the display sections.

4. The display device according to claim 3, comprising
a control section for controlling display produced by the display section and the instrument unit, wherein
the control section relates a content of the display produced by the display section to a content of the display produced by the instrument unit.

5. The display device according to claim 1, wherein
the display section includes:
   a concave section extending in the light irradiating direction and including a bottom face; and
   a light source disposed on the bottom face of the concave section, and the plurality of pores extend across the concave section of the display section.

6. The display device according to claim 5, wherein
the display device further includes a mount substrate extending between each of the instrument panel and the surface panel, and
the concave section is located in the mount substrate.

7. The display device according to claim 1, wherein
the plurality of pores formed as openings extend through the surface panel at a predetermined angle directed to the windshield with respect to a thickness direction of the surface panel.

8. The display device according to claim 1, wherein
the plurality of pores are integrally formed within the surface panel.

9. A display device comprising:
a display section for irradiating light to the windshield of a vehicle and the display section includes,
   a plurality of concave sections extending in the light irradiating direction, and each of the concave sections includes a bottom face, and
   a plurality of light sources, each of the light sources is disposed on the bottom face of a respective one of the concave sections; and
a surface panel positioned on a front side in a light irradiating direction of the display section and constituting part of a surface of an instrument panel of the vehicle, wherein the surface panel includes a plurality of pores formed as openings extending through the surface panel and across each of the concave sections in a direction connecting the display section to the windshield, and a light irradiating direction of the display section is set to a direction in which the light irradiated from the display section and reflected by the windshield is visually recognized by the driver such that the pores in the surface panel permit passage of light from the display section to the windshield while obscuring direct visibility of the display section by the driver.

10. The display device according to claim 9, wherein the concave sections are spaced along the substrate in a stepwise arrangement in a direction extending away from the windshield.

11. The display device according to claim 9, wherein
the display device further includes a mount substrate extending between each of the instrument panel and the surface panel, and
the concave sections are located in the mount substrate.

12. The display device according to claim 9, wherein
the plurality of pores formed as openings extend through the surface panel at a predetermined angle directed to the windshield with respect to a thickness direction of the surface panel.

13. The display device according to claim 9, wherein
the plurality of pores are integrally formed within the surface panel.

* * * * *